(12) United States Patent
Franko, Sr.

(10) Patent No.: US 7,172,220 B2
(45) Date of Patent: Feb. 6, 2007

(54) EXTENDED TEXT LABEL FOR A TUBE CONTAINER AND METHOD OF MANUFACTURE THEREOF

(75) Inventor: Joseph D. Franko, Sr., Ham Lake, MN (US)

(73) Assignee: Quality Assured Enterprises, Inc., Hopkins, MN (US)

( * ) Notice: Subject to any disclaimer, the term of this patent is extended or adjusted under 35 U.S.C. 154(b) by 0 days.

(21) Appl. No.: 10/005,757

(22) Filed: Nov. 2, 2001

(65) Prior Publication Data

US 2003/0085564 A1    May 8, 2003

(51) Int. Cl.
*B65D 30/02* (2006.01)
(52) U.S. Cl. .............................. 283/81; 283/94; 283/98; 283/101; 283/106; 428/40.1; 428/41.7; 428/41.8; 428/42.1; 428/42.2; 428/42.3; 40/630; 40/638; 206/459.5; 206/469; 206/484
(58) Field of Classification Search ................... 283/81, 283/94, 98, 101, 106; 428/40.1, 41.7, 41.8, 428/42.1, 42.3; 40/630, 638; 206/459.5, 206/469, 484
See application file for complete search history.

(56) References Cited

U.S. PATENT DOCUMENTS

| | | | | |
|---|---|---|---|---|
| 3,813,801 A | * | 6/1974 | Vander Schaaf | 40/306 |
| 3,940,496 A | * | 2/1976 | Turpin et al. | 426/123 |
| 3,986,640 A | * | 10/1976 | Redmond | 222/92 |
| 4,849,043 A | | 7/1989 | Instance | |
| 4,921,137 A | * | 5/1990 | Heijenga | 222/107 |
| 5,048,711 A | * | 9/1991 | Weiss et al. | 220/214 |
| 5,074,595 A | * | 12/1991 | Hill et al. | 283/81 |
| 5,264,265 A | | 11/1993 | Kaufmann | |
| 5,373,966 A | * | 12/1994 | O'Reilly et al. | 222/94 |
| 5,389,415 A | * | 2/1995 | Kaufmann | 428/41.3 |
| 5,672,224 A | * | 9/1997 | Kaufmann | 156/257 |
| 5,807,452 A | * | 9/1998 | Schwinn | 156/86 |
| 5,871,096 A | * | 2/1999 | Yakich | 206/459.5 |
| 5,967,560 A | | 10/1999 | Seidl | |
| 5,975,582 A | * | 11/1999 | Treleaven | 283/81 |
| 5,996,797 A | * | 12/1999 | Flaig | 206/494 |
| 5,996,845 A | * | 12/1999 | Chan | 222/107 |
| 6,119,853 A | * | 9/2000 | Garrill et al. | 206/204 |
| 6,129,959 A | | 10/2000 | Mercer et al. | |
| 6,162,158 A | | 12/2000 | Mercer et al. | |
| 6,308,827 B1 | * | 10/2001 | Hacikyan | 206/204 |
| 6,327,801 B1 | * | 12/2001 | Witkowski | 40/306 |
| 6,332,631 B1 | * | 12/2001 | Kirk | 283/81 |
| 6,594,927 B2 | * | 7/2003 | Witkowski | 40/310 |
| 6,786,515 B2 | * | 9/2004 | Franko, Sr. | 283/81 |
| 6,910,313 B2 | * | 6/2005 | De Cardenas et al. | 53/53 |

* cited by examiner

*Primary Examiner*—Boyer D. Ashley
*Assistant Examiner*—Mark Henderson
(74) *Attorney, Agent, or Firm*—Walter K. Roloff

(57) ABSTRACT

An extended text label is provided for a tube container, wherein the tube container includes a product dispensing end and a filling end opposite the dispensing end. The filling end is adapted to be sealed by a crimp method, subsequent to filling the tube container with a selected product. The extended text label includes a crimp edge. The crimp edge is capable of being securely joined to the filling end of the tube container by way of the crimp method.

3 Claims, 8 Drawing Sheets

EXTENDED TEXT LABEL FOR A TUBE CONTAINER AND METHOD OF MANUFACTURE THEREOF

FIELD OF THE INVENTION

The present invention relates generally to labels. The invention relates specifically to an extended text label for a tube container.

BACKGROUND OF THE INVENTION

In the printing arts, and in particular in the commercial printed label art for labeling and decorating consumer products, there exists a continual demand for labels and decorations which not only appeal to consumers, but also bear ever increasing amounts of printed information. For example, labels for identification of consumer health care and pharmaceutical products are often required by governmental regulations to describe in painstaking detail their compositions and ingredients. As new food and drug laws are passed, regulations require the inclusion of increasing amounts of label information. Manufacturers of consumer products and their packaging vendors have devised various schemes for inclusion of such extensive information. Among these are simply printing the information in small type on a product container box or carton, or including an information insert sheet within the box or carton. Obvious drawbacks to these schemes include increased packaging costs associated with a box or carton, and the fact that boxes, cartons, and insert sheets are often promptly discarded by a consumer.

In general in the labeling and packaging arts, various forms of so-called "extended text" labels have been proposed to provide increased printed information. One such extended text label type that has gained wide popularity is the booklet type label, where a base ply is joined to a top ply via an adhesive coupling or "hinge" between the two plies. An example of this type of label is disclosed in U.S. Pat. No. 5,264,265 issued to Kaufmann, entitled "PEEL-BACK RE-SEALABLE MULTI-PLY LABEL".

Attempts have been made to provide extended text labeling for particular containers and unique uses associated therewith. For example, in U.S. Pat. No. 5,967,560 issued to Seidl entitled "HANGING LABEL", a label includes an integral suspension strap for suspending a bottle (e.g., an intravenous infusion bottle) to which the label is attached.

However, no provision has heretofore been made for simply and inexpensively labeling a tube container with an extended text label.

In U.S. Pat. No. 6,129,959 issued to Mercer, et al., entitled "SLEEVE LABEL WITH INTEGRAL FLAP AND/OR HEADER", a tubular sleeve of polymeric film is adapted for use as a sleeve label on a consumer product such as a plastic bottle or jug. The sleeve label may provide a tear-off coupon.

In U.S. Pat. No. 6,162,158 also issued to Mercer, et al., entitled "METHOD OF FABRICATING A SLEEVE LABEL WITH MULTILAYERED INTEGRAL FLAPS", a sleeve label is fabricated from a sheet of multi-folded polymeric material. Additional folding results in a multi-page booklet type label for a bottle or jug.

Labels such as those disclosed above, however, are not suited for providing extended text labeling of tube containers. Specifically, tube containers typically do not have a uniform circumference, and are subject to deformation in use by squeezing to force product out therefrom. Thus, the disclosed labels cannot be satisfactorily utilized with such tubes.

Therefore, there exists a need for an extended text label for a tube container that may be readily secured thereto, and that may be simply and inexpensively produced.

It is generally accepted and well-known in the label making arts that in-line printing and converting processes offer the most cost-effective label production. An exemplary in-line method is disclosed in U.S. Pat. No. 4,849,043 issued to Instance, entitled "METHOD OF PRODUCING LABELS".

Therefore, there also exists a need for an in-line converting and printing process for manufacture of such extended text labels for tube containers.

SUMMARY OF THE INVENTION

An object of the present invention is to provide an extended text label for a tube container that is inexpensive and simple to produce.

Another object of the present invention is to provide an extended text label for a tube container that may be readily utilized therewith.

A further object of the present invention is to provide an in-line converting and printing process for manufacture of such labels.

In accordance with the present invention, an extended text label for a tube container includes a base ply and a top ply. The label may also include one or more intermediate plies, provided between the base and top plies. Each ply is capable of bearing graphic images. The plies are adhesively coupled in hinge fashion to form a booklet, and may be further provided with a resealable closure. The label includes a crimp edge that is capable of being securely joined to a filling end of a tube container by way of a crimp method.

DETAILED DESCRIPTION OF THE INVENTION

Figure 1:
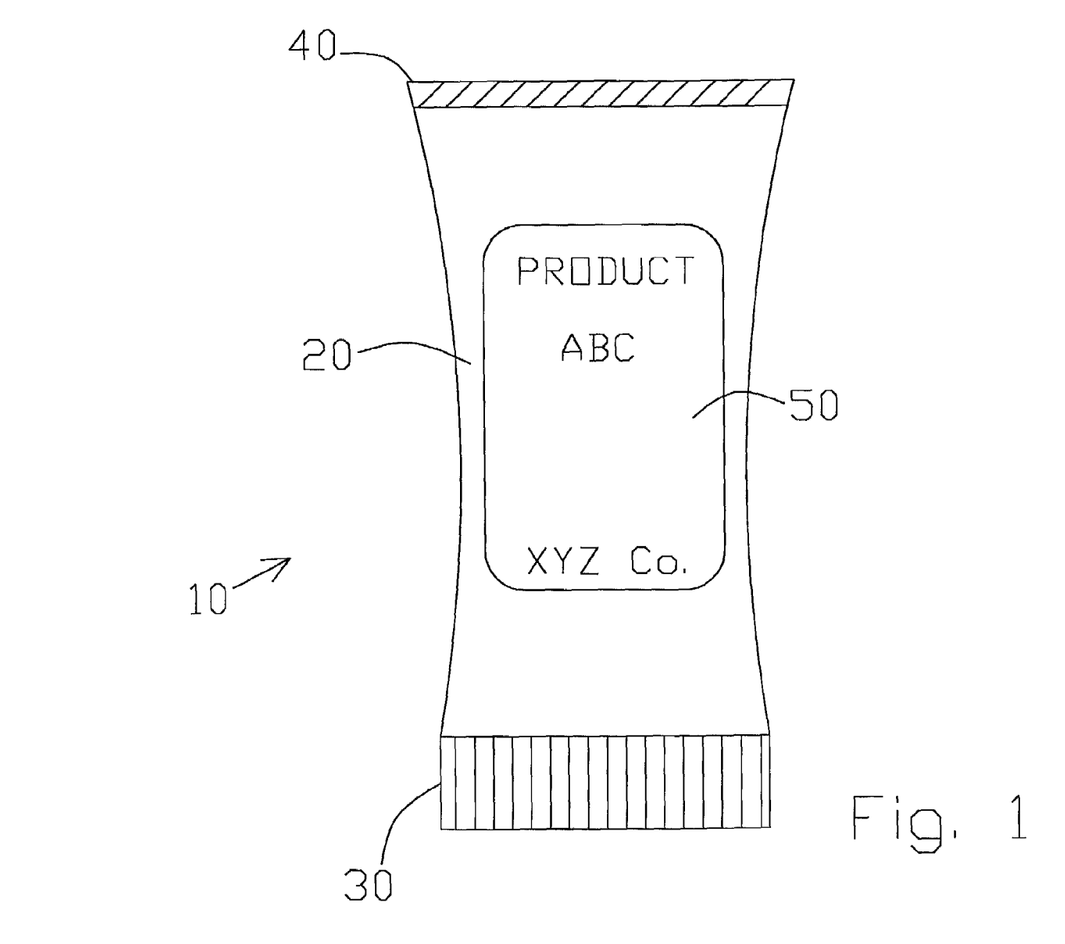
FIG. 1 is an illustration of a conventional tube container.

Referring to FIG. 1, there shown is a conventional tube container 10. Container 10 is typically fabricated from a pliable material 20. Commonly, the fabrication is accomplished by either a so-called extrusion process, where the pliable material may be a plastic, or by a so-called lamination process, where the pliable material may be a foil.

As is well known, container 10 includes a product dispensing end 30 and an opposing filling end 40. Dispensing end 30 commonly includes a dispensing cap whereby a product within container 10 may be squeezed out therefrom.

Container 10 also commonly includes a product identification label 50. Label 50 may be provided by way of, for example, a simple adhesive label, or by any number of direct decorating techniques.

Although not depicted in FIG. 1, in an assembly line production of a finished consumer product including container 10, a semi-liquid product is introduced thereto via filling end 40. After container 10 has been filed with the product, container 10 passes in the assembly line to a sealing station employing a crimp method for sealing container 10 at filling end 40. The crimp method typically employs either an electric heat element/water-cooled crimping device (for plastic tubes) or an ultrasonic heat sealing and crimping device (for foil tubes). The crimp method may be provided by any commercially available tube filling equipment.

Figure 2:
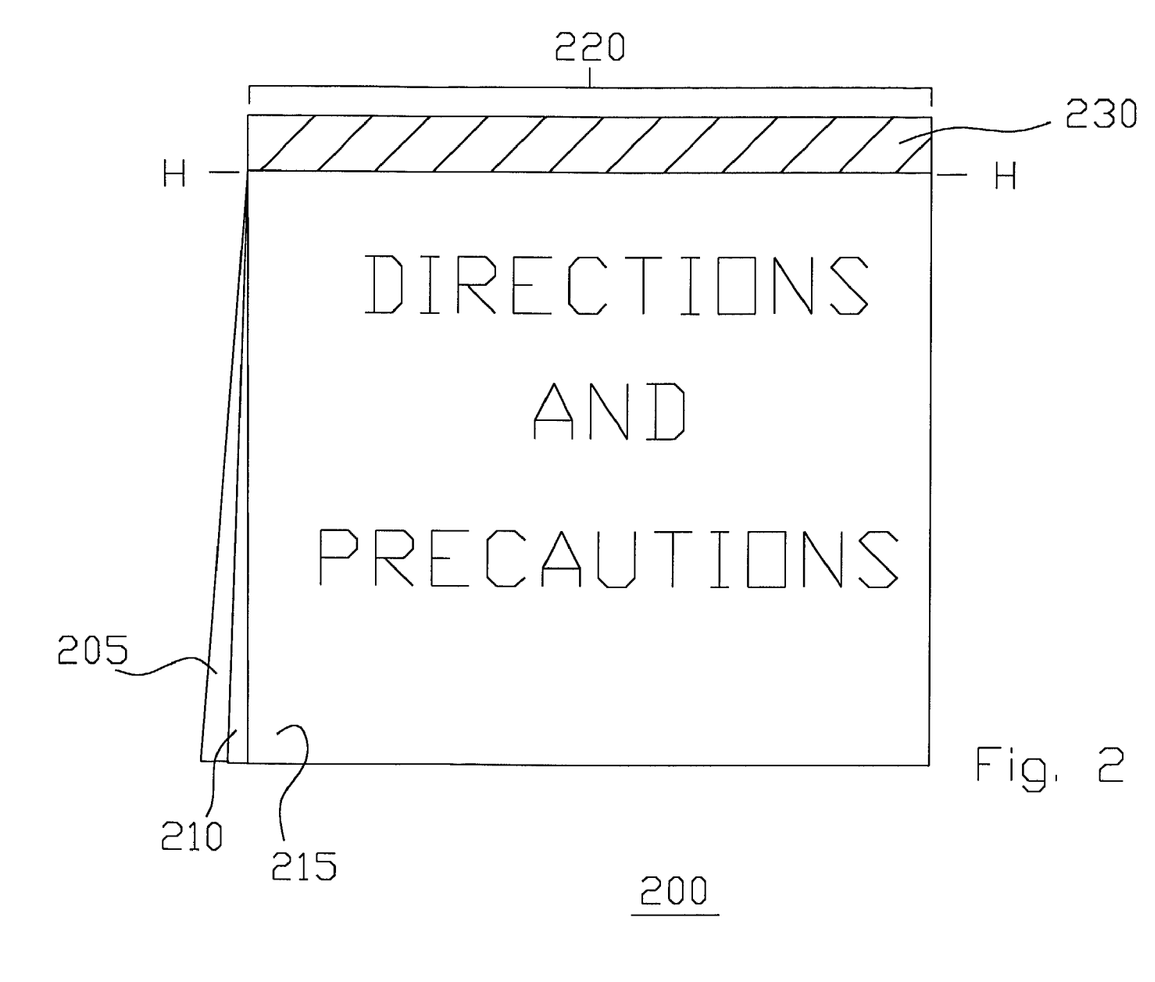
FIG. 2 is an illustration of an extended text label for a tube container, constructed in accordance with the present invention.

In FIG. 2, an extended text label for a tube container 200 (hereinafter, "label 200") is depicted. Therein, label 200 includes a base ply 205 and a top ply 215. Label 200 may include any number of intermediate plies 210. Conventionally, base ply 205 and top ply 215 (along with intermediate plies 210, if any) are adhesively joined in hinge fashion about axis H—H along longitudinal hinge portion 220. Hinge portion 220 along axis H—H facilitates opening and closing of label 200 in use, in booklet fashion. Label 200 further includes a pliable attachment tongue 230, which is an extension of base ply 205. It is to be appreciated that tongue 230 allows label 200 to conform in repose to container 10 (as will be described in FIG. 4*a*).

Figure 3:
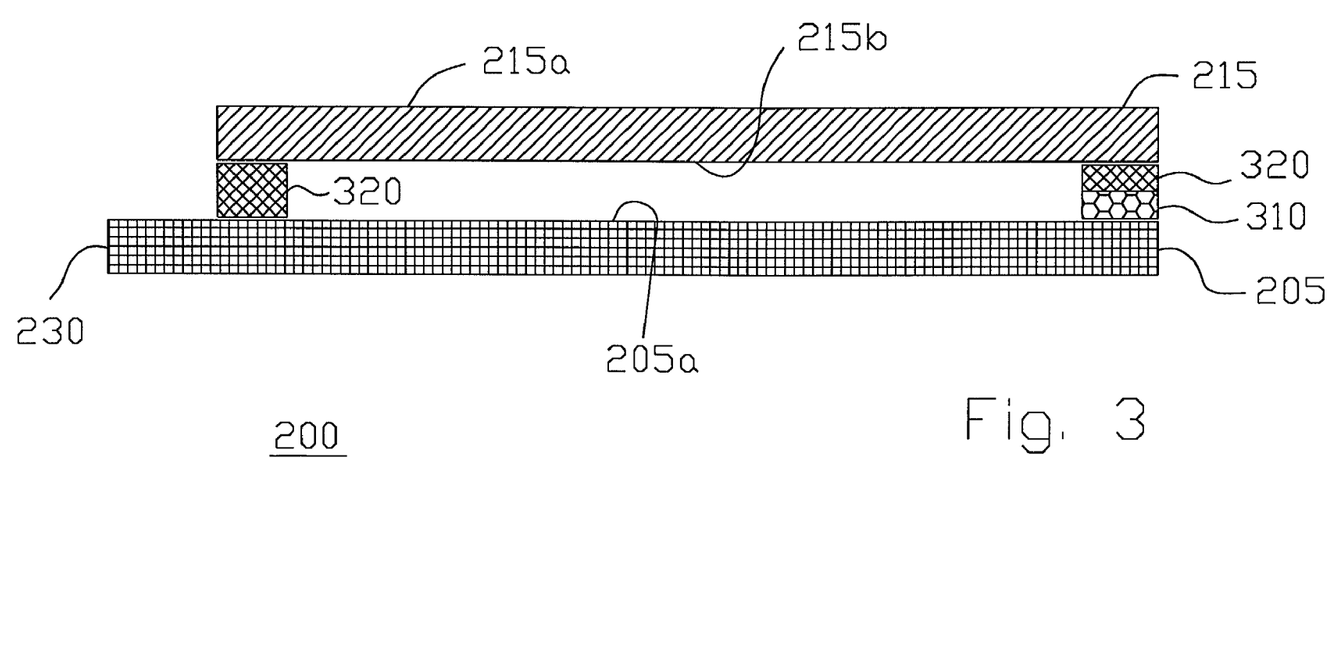
FIG. 3 is a magnified cross-sectional view of the extended text label for a tube container of FIG. 2.

As is to be understood with particular reference to FIG. 3, label 200 may be capable of being releasably resealed, by way of, for example, applications of release coating 310 and adhesive coating 320 to top surface 205*a* of base ply 205 and to bottom surface 215*b* of top ply 215 (any plies 210 have been omitted from the figure). It is to be appreciated that adhesive coating 320 securely bonds the plies of label 200 at hinge portion 220, while adhesive coating 320 in combination with release coating 310 creates a resealable closure for label 200 as may be desired in a particular application.

Coatings 310 and 320 are preferably chosen from water-based, solvent-based, ultraviolet light activated, and hot melt coatings as are commercially available from Craig Adhesives & Coatings Co. of Newark, N.J., and Northwest Coatings Corp. of Oak Creek, Wis.

Plies 205, 210 (if any) and 215 are preferably any commercially available web-like materials that are capable of use in an in-line printing and converting process (as will be further described relative to manufacture of label 200). As used herein, however, "web-like materials" denotes any suitable material, including paper, film, polypropylene, polyethylene, polyester, polyvinylchloride, polystyrene, foil, and ethylene vinyl acetate.

Each ply of label 200 is preferably capable of bearing printed graphics thereon (as shown on top ply 215 in FIG. 2) to maximize an amount of information that may be conveyed by label 200.

Figure 4:
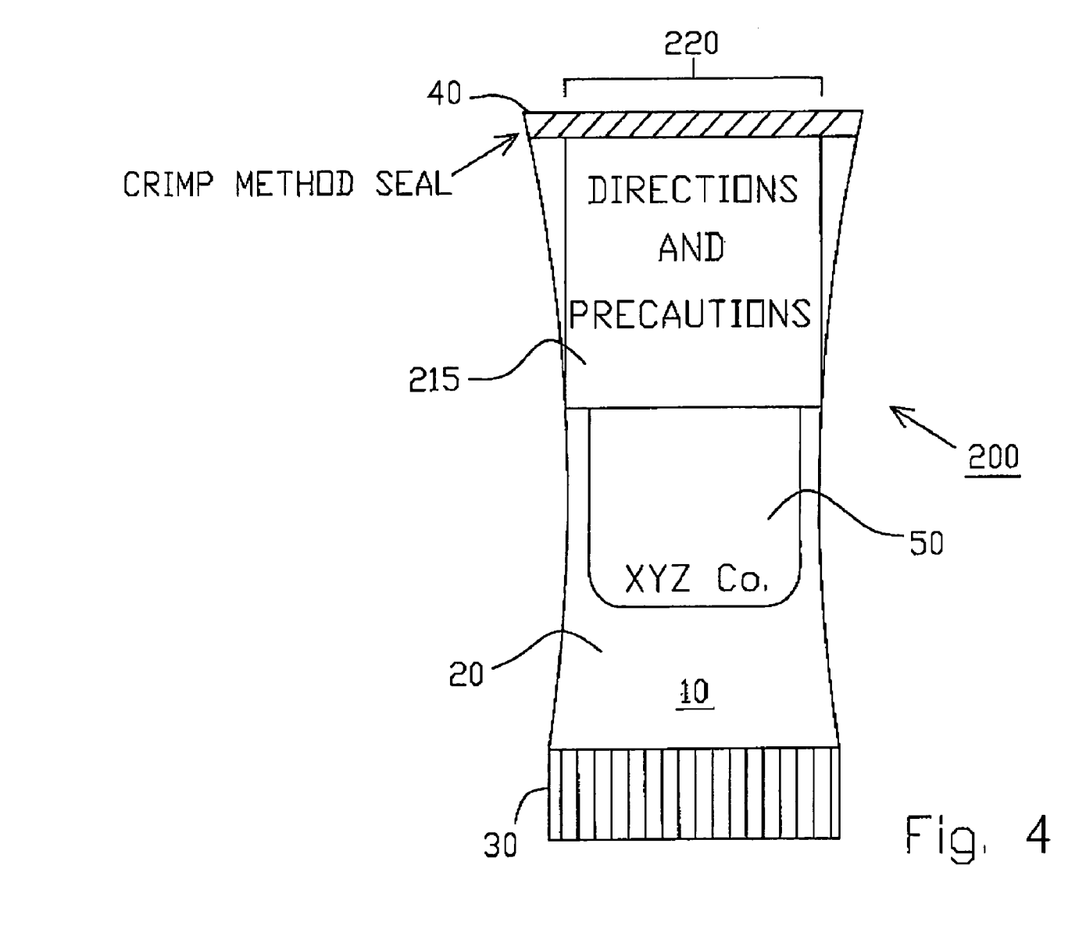
FIG. 4 is an illustration of the extended text label for a tube container of FIG. 2, shown as having been secured to the tube container of FIG. 1.
Figure 4A:
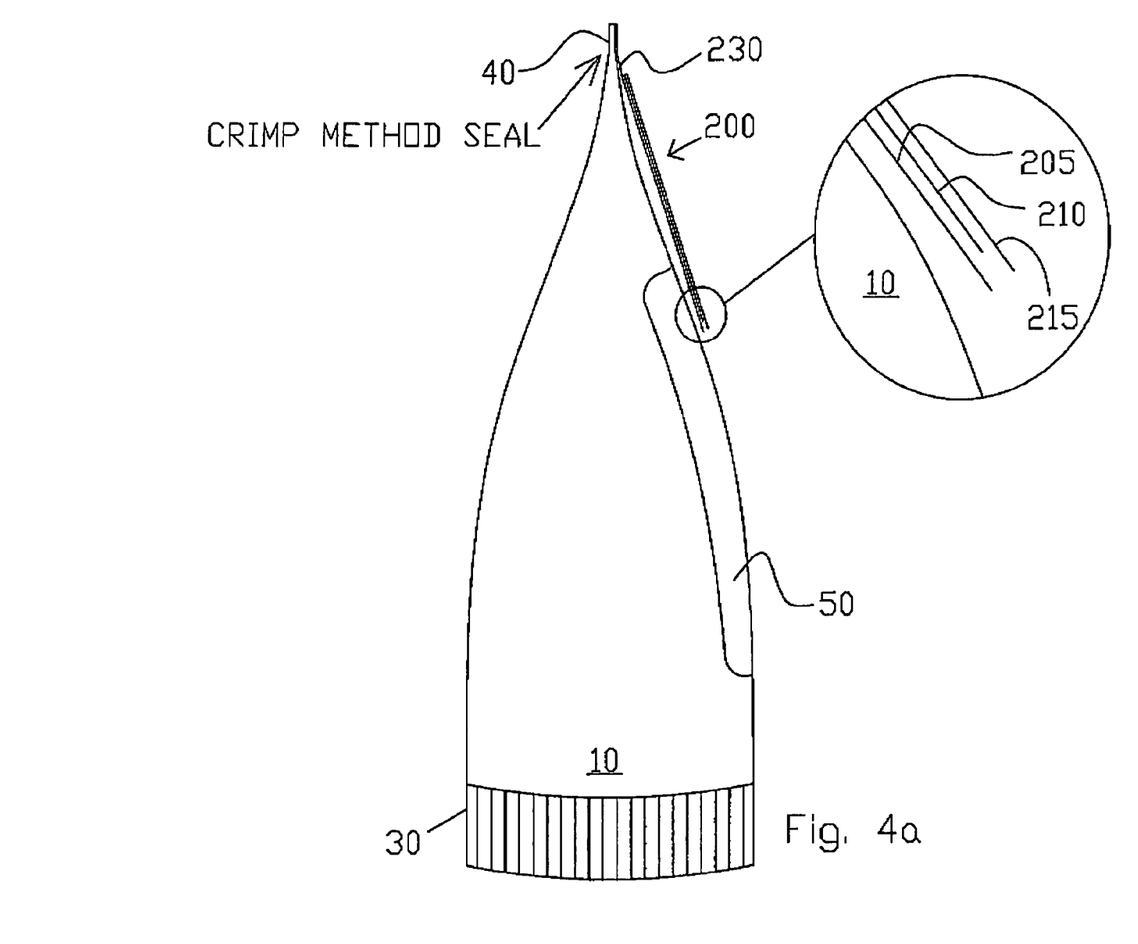
FIG. 4a is a side view of the extended text label for a tube container of FIG. 2, shown as having been secured to the tube container of FIG. 1.

FIGS. 4 and 4*a* depict label 200 of FIG. 2 as having been secured by a crimp method to container 10. As mentioned above, with particular reference now to FIG. 4*a*, tongue 230 of label 200 allows label 200 to better conform in repose to container 10. Specifically, as may be ascertained from the profile figure, tongue 230 provides a pliable elongated attachment point for label 200 to container 10. By choice of a suitable length of tongue 230, label 200 is prevented from appreciably protruding outwardly from container 10.

It is to be noted that the crimp method of attachment of label 200 to container 10 in FIGS. 4–4*a* may be accomplished in a one-step operation as described above, variously referred to as a thermoplastic bonding/crimping technique. Alternatively, the crimp method may take a two-step operation, wherein container 10 is first crimped shut along filling end 40 in the thermoplastic bonding/crimping technique (after a product is filled therein). Then, label 200 is adhered to filling end 40 by way of a heat-activated adhesive coating provided along tongue 230. It is to be appreciated that heat required to activate the adhesive coating along tongue 230 is of a lesser temperature than that of the thermoplastic bonding/crimping technique utilized to crimp shut filling end 40, so that the filling is not compromised.

Figure 5:
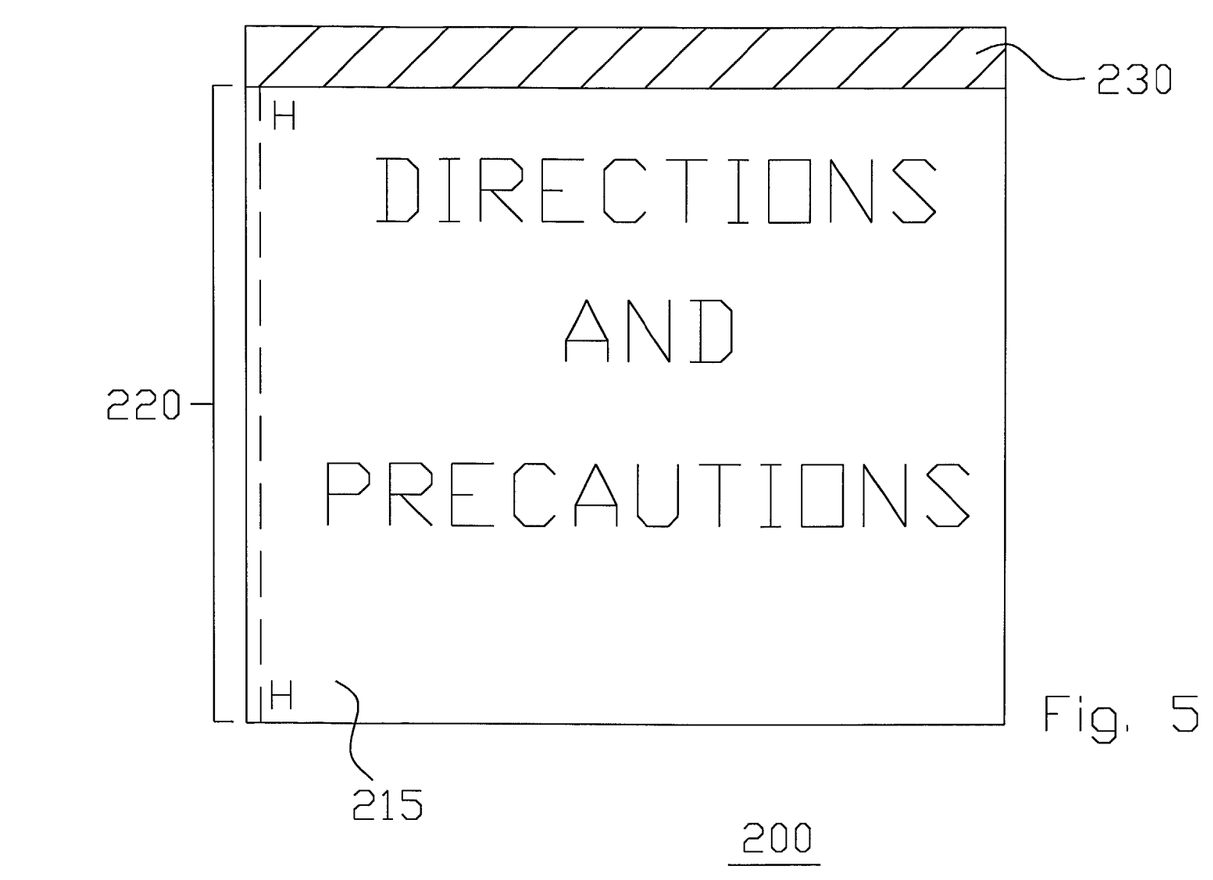
FIG. 5 is an illustration of another alternative embodiment of the label of FIG. 2, constructed in accordance with the present invention.
Figure 6:
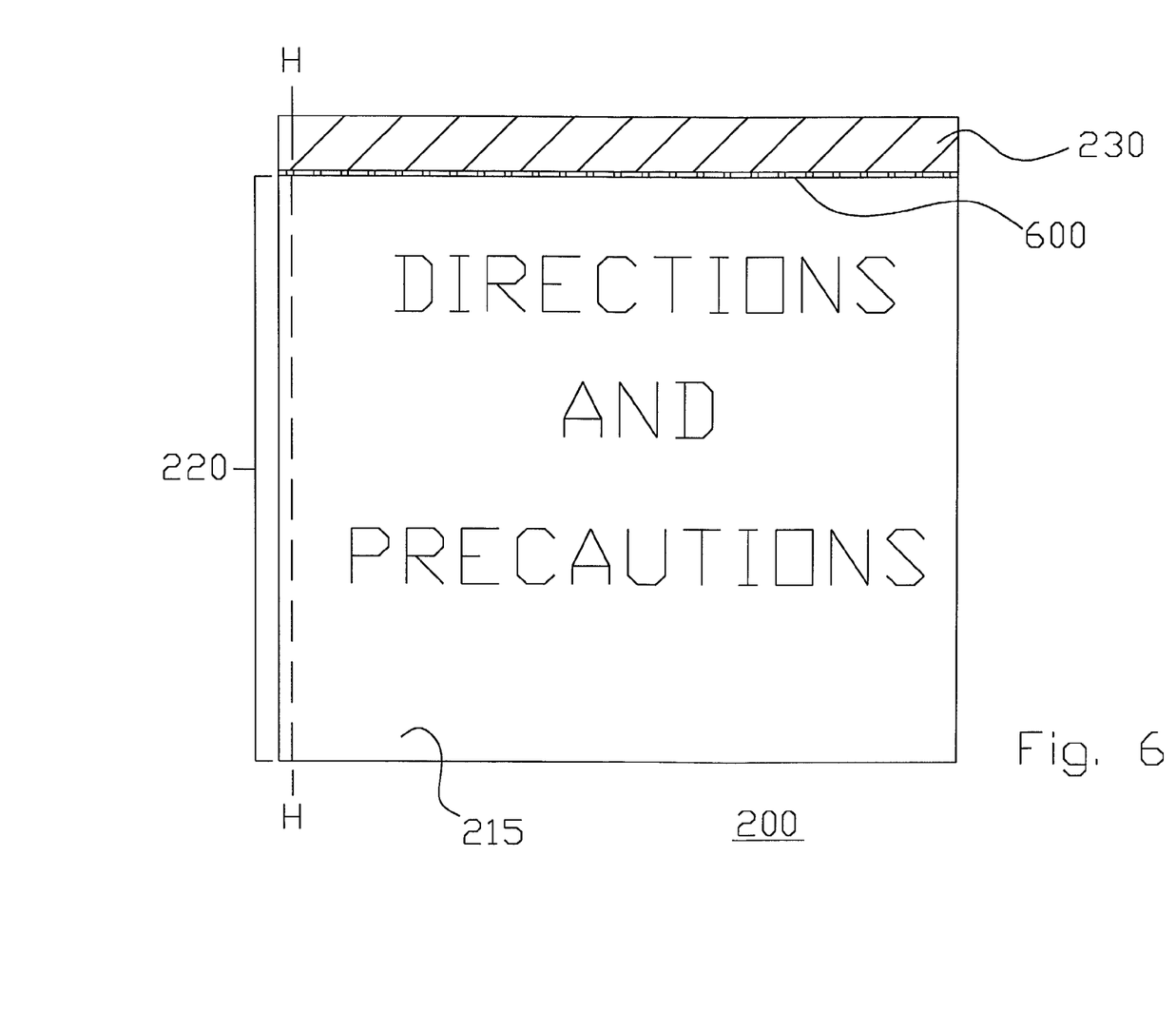
FIG. 6 is an illustration of yet another alternative embodiment of the label of FIG. 2, constructed in accordance with the present invention.

Turning, now, to FIGS. 5 and 6, there illustrated are alternative embodiments of label 200. Specifically, in FIG. 5, hinge axis H—H is shown as being orthogonal to attachment tongue 230. It is to be appreciated that in this configuration, label 200 may be opened in booklet fashion in a left-to-right sense (as contrasted by a top-to-bottom sense in FIG. 2). In FIG. 6, label 200 of FIG. 5 includes a perforated or scored tear off portion 600 along tongue 230. In this embodiment, label 200 may be permanently removed or torn off from tongue 230 and container 10.

Figure 7:
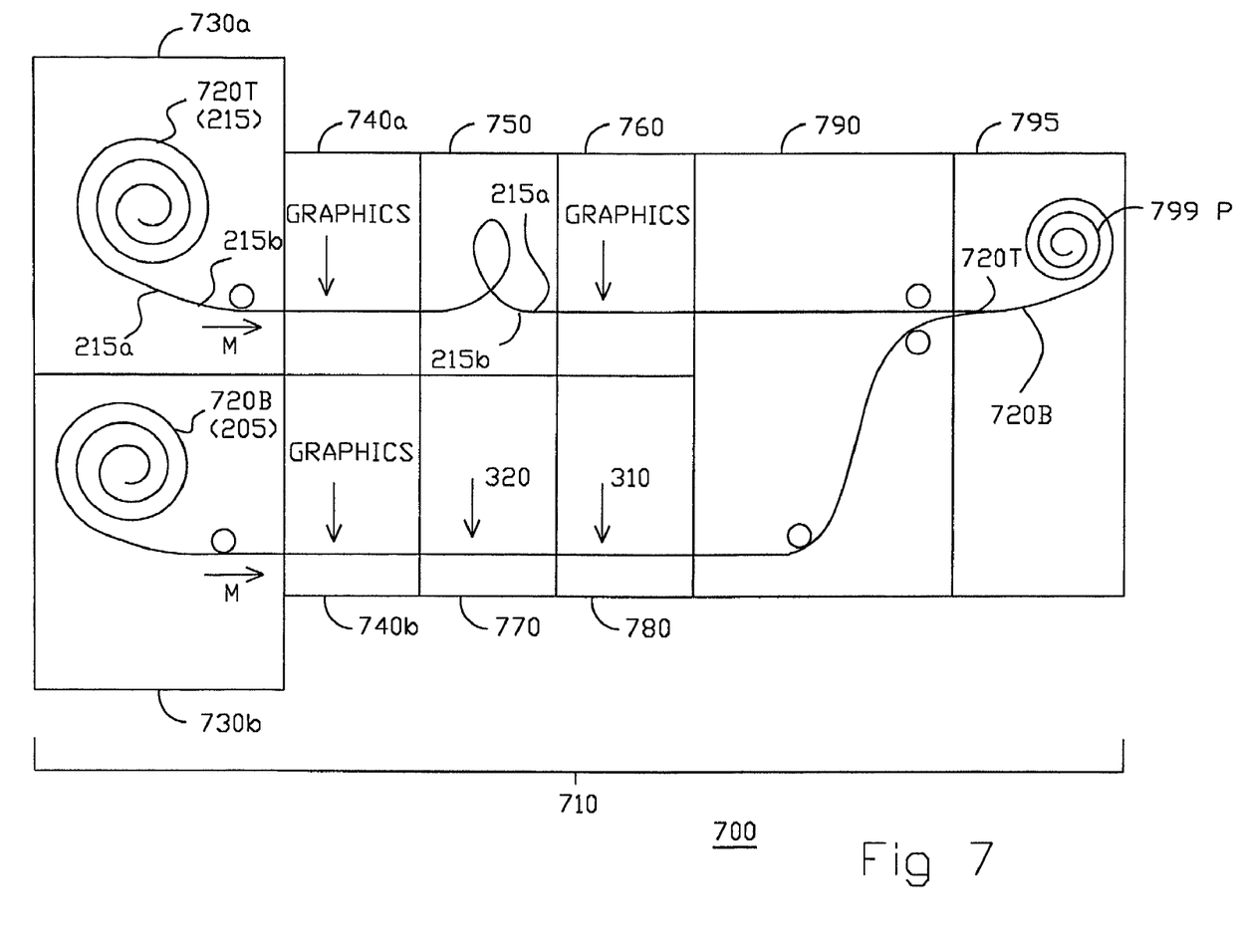
FIG. 7 is a schematic diagram of a manufacturing method for production of an extended text label for a tube container of the present invention.

With attention, now, to FIG. 7, there depicted in schematic fashion is an exemplary in-line web press manufacturing installation 700 including multi-unit inline printing and converting press 710, for mass production of label 200.

Multi-unit press 710 of installation 700 includes unwind units 730*a* and 730*b*, first and second printing units 740*a* and 740*b*, a web turning unit 750, a third printing unit 760, a first coating unit 770, a second coating unit 780, a nip roller web joining unit 790, and a final re-wind unit 795, as will now each be further described in construction of a web of labels 200.

It is to be understood that press 710 is selectively capable of providing a variable number of print stations for application and drying of pigmented inks, coatings, and adhesives. As understood by those of ordinary skill in the printing arts, the exemplary multi-unit press 710 may be any suitable narrow- or wide-web press such as a flexographic, letterpress, gravure, screen, or offset press. Such presses are commercially available from, for example, Comco International of Milford, Ohio, or Mark Andy Inc. of St. Louis, Mo.

As a simple example of construction of labels 200 having no intermediate plies 210, an unsupported web 720T (top ply 215 in FIG. 2) is supplied in a conventional roll form to press 710 at unwind unit 730*a*, and in a lengthwise machine direction M thereto. Simultaneously, an unsupported web 720B (base ply 205 in FIG. 2) is also preferably supplied in a conventional roll form to press 710 at unwind unit 730*b* in lengthwise machine direction M. Webs 720T and 720B are any suitable in-line web material such as a plastic (e.g., the aforementioned AET Films material) or a foil.

Unwind units 730*a*–*b* pass webs 720T-B, respectively, to first printing units 740*a* and 740*b*, respectively, where selected graphics are printed thereon (e.g., on bottom surface 215*b* of top ply 215, and on top surface 205*a* of base ply 205, as shown in FIG. 2).

Web 720B bearing graphics is then passed to first coating unit 770, where adhesive coating 320 is selectively applied thereto (as depicted in FIG. 2). Web 720B then passes to second coating unit 780, where release coating 310 is applied thereto (also as depicted in FIG. 2).

While web 720B is being processed as aforedescribed, web 720T is simultaneously passed to web turning unit 750, where web 720T is turned over. The turning of web 720T may be provided by, for example, a turn-bar technique as is known in the art. Additionally, web 720T is then passed to third printing unit 760, where graphics are printed on front surface 215a of top ply 215.

Webs 720T and 720B then pass from units 760 and 780, respectively, to nip roller web joining unit 790. At unit 790, webs 720T-B are adhesively joined by way of adhesive coating 120. Referring also to FIG. 3, this adhesive joining of webs 720T-B forms the aforementioned hinge portion 220 which acts to securely bond together top ply 215 and base ply 205 along hinge axis H—H. Adhesive coating 320 also provides, in combination with release coating 310, the aforementioned releasable bond between plies 215 and 205.

Adhesively joined webs 720T-B then pass to final re-wind unit 795 where the combined webs are re-wound into a supply roll of a finished product 799P carrying individual labels 200 (as shown in FIGS. 2, 5, and 6, as the case may be). Finished product 799P is then made available to a customer for use in the customer's roll-fed wrap labeling machines.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results, or that various accessories may be added thereto.

It is to be appreciated that any of the aforedescribed coatings and graphics may be selectively provided in any suitable combination on label 200, for a particular desired use thereof.

It is also to be understood in general that any suitable alternatives may be employed to provide the extended text label for a tube container of the present invention, along with its manufacturing scheme. Thus, for example, the alternatives of FIGS. 5 and 6 may be employed in various combinations and configurations with each other, or with the label of FIG. 2.

Lastly, the choice, of course, of compositions, sizes, and strengths of various aforementioned components of label 200 are all a matter of design choice depending upon intended uses of the present invention. Although label 200 has been depicted as being no larger than container 10, it could be any desired size.

Accordingly, these and other various changes or modifications in form and detail of the present invention may also be made therein, again without departing from the true spirit and scope of the invention as defined by the appended claims.

What is claimed is:

1. An extended text label for a capped tube container in combination, wherein a capped tube container includes a product dispensing end having a dispensing cap and a filling end opposite said product dispensing end, the combination comprising:
    a capped tube container, including a crimp method seal at said filling end thereof that is crimped subsequent to filling said capped tube container with a selected product;
    an extended text label that is securely joined to said filling end of said capped tube container by way of said crimp method seal; and
    a pliable attachment tongue extending outwardly from said extended text label such that said tongue is securely joined to said filling end of said capped tube container at said crimp method seal.

2. An extended text label for a capped tube container in combination, wherein a capped tube container includes a product dispensing end having a dispensing cap and a filling end opposite said product dispensing end, the combination comprising:
    a capped tube container, including a crimp method seal at said filling end thereof that is crimped subsequent to filling said capped tube container with a selected product;
    an extended text label that is securely joined to said filling end of said capped tube container by way of said crimp method seal; and
    a tear off portion for permanently removing said extended text label from said tube container after said extended text label has been securely joined to said filling end of said capped tube container at said crimp method seal.

3. An extended text label for a capped tube container in combination, wherein a capped tube container includes a product dispensing end having a dispensing cap and a filling end opposite said product dispensing end, the combination comprising:
    a capped tube container, including a crimp method seal at said filling end thereof that is crimped subsequent to filling said capped tube container with a selected product;
    an extended text label that is securely joined to said filling end of said capped tube container by way of said crimp method seal;
    a pliable attachment tongue extending outwardly from said extended text label such that said tongue is securely joined to said filling end of said capped tube container at said crimp method seal; and
    a tear off portion for permanently removing said extended text label from said tube container after said extended text label has been securely joined to said filling end of said capped tube container at said crimp method seal.

* * * * *